(12) United States Patent
Kim et al.

(10) Patent No.: US 10,054,018 B2
(45) Date of Patent: Aug. 21, 2018

(54) CATALYZED PARTICULATE FILTER

(71) Applicant: HYUNDAI MOTOR COMPANY, Seoul (KR)

(72) Inventors: Pyung Soon Kim, Suwon-si (KR); Chang Hwan Kim, Seongnam-si (KR); Chun Yong Kang, Yongin-si (KR); ChangHo Jung, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/341,059

(22) Filed: Nov. 2, 2016

(65) Prior Publication Data

US 2017/0198618 A1  Jul. 13, 2017

(30) Foreign Application Priority Data

Jan. 7, 2016  (KR) ........................ 10-2016-0002122

(51) Int. Cl.
| | |
|---|---|
| *F01N 3/035* | (2006.01) |
| *B01D 53/86* | (2006.01) |
| *B01D 53/88* | (2006.01) |
| *B01D 53/94* | (2006.01) |
| *F01N 3/022* | (2006.01) |

(52) U.S. Cl.
CPC ......... *F01N 3/035* (2013.01); *B01D 53/8643* (2013.01); *B01D 53/885* (2013.01); *B01D 53/94* (2013.01); *F01N 3/0222* (2013.01); *F01N 3/0224* (2013.01); *B01D 2255/9155* (2013.01); *F01N 2330/06* (2013.01); *F01N 2330/08* (2013.01); *F01N 2330/10* (2013.01); *F01N 2330/12* (2013.01); *F01N 2330/22* (2013.01)

(58) Field of Classification Search
CPC ........ F01N 3/03; F01N 3/0222; F01N 3/0224; F01N 2330/10; F01N 2330/02
USPC .................................................... 422/177, 180
See application file for complete search history.

(56) References Cited

U.S. PATENT DOCUMENTS

| | | | |
|---|---|---|---|
| 7,718,143 B2* | 5/2010 | Ogura | ................... B01D 53/944 422/180 |
| 2002/0054838 A1* | 5/2002 | Rao | ........................... F01N 3/28 422/180 |
| 2003/0211020 A1* | 11/2003 | Rao | ........................ F01N 1/082 422/180 |

FOREIGN PATENT DOCUMENTS

| | | |
|---|---|---|
| JP | 2003-056327 A | 2/2003 |
| JP | 3922077 B2 | 5/2007 |
| JP | 2007-244951 A | 9/2007 |
| JP | 2013-032706 A | 2/2013 |
| KR | 10-1999-0073040 A | 10/1999 |

* cited by examiner

*Primary Examiner* — Tom P Duong
(74) *Attorney, Agent, or Firm* — McDermott Will & Emery LLP

(57) ABSTRACT

A catalyzed particulate filter includes at least one inflow channel including one end where a fluid inflows and another end that is blocked and extends in a length direction, at least one outflow channel including one end that is blocked and another end where the fluid outflows, and the other end extends in the length direction, at least one porous wall defining a boundary between the inflow channel and the outflow channel neighboring each other and extending in the length direction, and a catalyzed supporting member disposed on an inside of the outflow channel, wherein the supporting member includes a plurality of balls.

9 Claims, 9 Drawing Sheets

CATALYZED PARTICULATE FILTER

CROSS-REFERENCE TO RELATED APPLICATION

This application claims the benefit of priority to Korean Patent Application No. 10-2016-0002122 filed with the Korean Intellectual Property Office on Jan. 7, 2016, the entire contents of which are incorporated herein by reference.

TECHNICAL FIELD

The present disclosure relates to a catalyzed particulate filter. More particularly, the present disclosure relates to a catalyzed particulate filter for increasing a contact time, or area, of a catalyst and a fluid while minimizing an increasing of a back pressure.

BACKGROUND

Particulate matter (PM) is included in a gas exhausted from an internal combustion engine such as a diesel engine or various combustion devices. When the PM is released into the atmosphere, a particulate filter for collecting the PM is mounted in the exhaust system of the exhaust gas for environmental reasons.

The particulate filters may be divided into a flow-through type particulate filter and a wall flow type particulate filter depending on a flow of the fluid, or exhaust gas. According to the flow-through type particulate filter, the fluid inflowing to one channel does not flow to other channels, but flows in only one channel. Accordingly, the increasing of the back pressure is minimized, however a means to collect the particulate matter included in the fluid is required and a filter performance may be deteriorated. In the wall flow type particulate filter, the fluid inflowing in one channel moves to neighboring other channel and is then exhausted from the particulate filter through the other channel. That is, the fluid inflowing to the inflow channel moves to an outflow channel through a porous wall, and is exhausted from the particulate filter through the outflow channel.

When the fluid passes through the porous wall, the particulate matter included in the fluid does not pass the porous wall, but is collected. In the wall flow type particulate filter, the back pressure may increase, however the wall flow type particulate filter is effective in filtering the particulate matter. Accordingly, the wall flow type particulate filter is often used. In the vehicle, at least one catalytic converter is mounted along with the particulate filter. The catalytic converter is configured to purify a carbon monoxide (CO), a hydrocarbon (HC) and a nitrogen oxide ($NO_x$) included in the exhaust gas. The catalytic converter may be mounted to be physically separated from the particulate filter, and may be merged to the particulate filter by coating the catalyst to the particulate filter.

The particulate filter coated with the catalyzed is referred to a catalyzed particulate filter (CPF). In the CPF, the catalyst is coated at the porous wall dividing the inflow channel and the outflow channel, and the fluid passes through the porous wall and is contacted with the coated catalyst. A pressure difference may exist between the inflow channel and the outflow channel divided by the porous wall, and thereby the fluid quickly passes the porous wall. Accordingly, the contact time of the catalyst and the fluid is short such that the catalyst reaction is not sufficiently generated. Also, if the catalyst coated to the porous wall is thick, the catalyst may block, or partially block, the micro pore formed at the wall such that the flow of the fluid from the inflow channel to the outflow channel may be reduced. Accordingly, a back pressure increases.

To minimize the increasing of the back pressure, the catalyst is thinly coated in the CPF. Accordingly, the amount of the catalyst coated in the CPF is such that the catalyst reaction may be not sufficiently generated. To solve these problem, by increasing a number of the inflow channels and the outflow channels (hereinafter, commonly referred to as cell), a surface of the wall in which the catalyst is coated may increase. However, if the density of the cell increases in the limited space, the thickness of the wall may be decreased. The reduction of the thickness of the wall may cause a deterioration of the filter performance. Accordingly, the density of the cell may not increase by more than a limit density.

The above information disclosed in this Background section is only for enhancement of understanding of the background of the disclosure and therefore it may contain information that does not form the prior art that is already known in this country to a person of ordinary skill in the art.

SUMMARY

Accordingly, the present disclosure provides a catalyzed particulate filter for increasing a catalyst loading amount while minimizing the increasing of back pressure. Also, the present disclosure provides a catalyzed particulate filter for increasing a contact time of the catalyst and the fluid while minimizing the increasing of back pressure.

According to an exemplary embodiment of the present disclosure, a catalyzed particulate filter includes at least one inflow channel including one end where a fluid inflows and another end that is blocked and extends in a length direction; at least one outflow channel including one end that is blocked and another end where the fluid outflows and the other end extends in the length direction; at least one porous wall defining a boundary between the inflow channel and the outflow channel neighboring each other and extending in the length direction; and a catalyzed supporting member disposed on an inside of the outflow channel, wherein the supporting member includes a plurality of balls.

The supporting member may include any one of a porous ball and a catalyst supporting ball.

The supporting member may include a ceramic ball.

The supporting member may include an alumina ball.

The porous wall may be coated with the catalyst.

According to another exemplary embodiment of the present disclosure, a catalyzed particulate filter includes at least one inflow channel including one end where a fluid inflows and another end that is blocked and extends in a length direction; at least one outflow channel including one end that is blocked and another end where the fluid outflows and the other end extends in the length direction; at least one porous wall defining a boundary between the inflow channel and the outflow channel neighboring each other and extending in the length direction; and a catalyzed supporting member disposed on an inside of the outflow channel, wherein the supporting member includes a structure having a porous structure.

The supporting member may include at least one selected from the group consisting of a metal foam, a metal fiber, a wire mesh, a ceramic foam and a ceramic fiber.

The metal foam, the metal fiber, and the wire mesh may include at least one selected from the group consisting of aluminum, copper, nickel, manganese, magnesium, iron and titanium.

The ceramic foam and the ceramic fiber may include at least one selected from the group consisting of silicon, carbon and nitrogen.

The supporting member may include at least one of a catalyst foam and a catalyst fiber.

As described above, by forming the supporting member inside at least one outflow channel and coating the catalyst to the supporting member, the catalyst loading amount may increase while minimizing the increasing of back pressure. Also, since the catalyst loading amount and the contact area (time) of the fluid and the catalyst may increase while maintaining the thickness of the wall, the filter performance and the catalyst performance may be sufficiently obtained.

DETAILED DESCRIPTION

Figure 1:
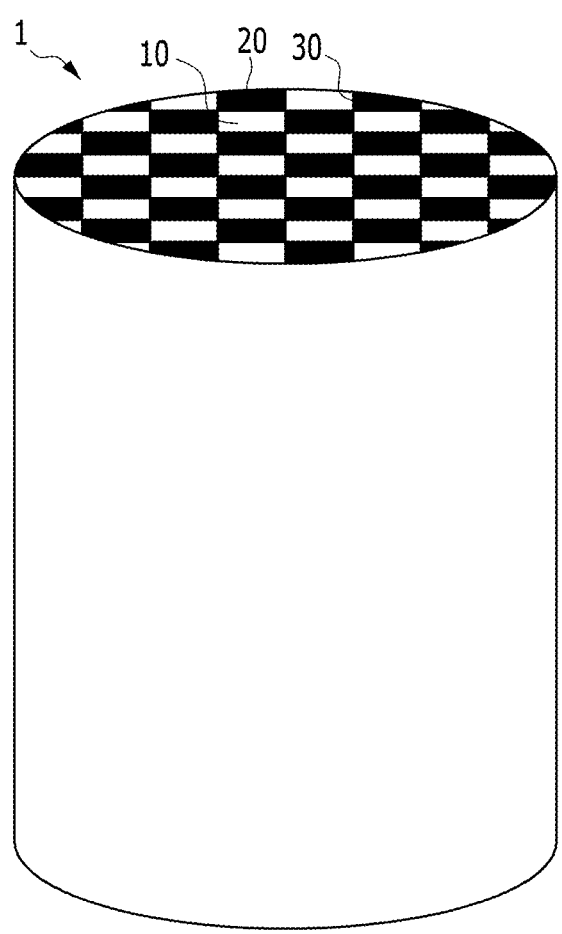
FIG. 1 is a perspective view of a catalyzed particulate filter according to a first exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure. The drawings and description are to be regarded as illustrative in nature and not restrictive. Like reference numerals designate like elements throughout the specification. Further, since sizes and thicknesses of constituent members shown in the accompanying drawings are arbitrarily given for better understanding and ease of description, the present disclosure is not limited thereto. In the drawings, the thickness of layers, films, panels, regions, etc., may be exaggerated for clarity. In the drawings, for better understanding and ease of description, the thicknesses of some layers and areas are exaggerated. In addition, unless explicitly described to the contrary, the word "comprise" and variations such as "comprises" or "comprising" will be understood to imply the inclusion of stated elements but not the exclusion of any other elements. Further, in the specification, the phrase "on a plane" means viewing the object portion from the top, the phase "on a rear" means viewing the objection from the bottom, and the phrase "on a cross-section" means viewing a cross-section of which the object portion is vertically cut from the side. A catalyzed particulate filter according to an exemplary embodiment of the present disclosure may be applied to various devices obtaining energy by burning a fossil fuel and exhausting a gas generated in a process thereof into the atmosphere, as well as a vehicle. In the present specification, the catalyzed particulate filter is applied to a vehicle, however it is not necessary that the catalyzed particulate filter must be applied to a vehicle.

An engine to generate power is mounted to the vehicle. The engine converts chemical energy into mechanical energy by combusting a mixture in which the fuel and air are mixed. The engine is connected to an intake manifold to inflow the air to inside a combustion chamber and is connected to an exhaust manifold such that the exhaust gas generated in a combustion process is collected in the exhaust manifold and is exhausted to the outside of the vehicle. An injector is mounted in the combustion chamber or the intake manifold to inject the fuel to the inside of the combustion chamber or the intake manifold. The exhaust gas generated in the engine is exhausted outside of the vehicle through an exhaust device. The exhaust device may include an exhaust pipe and an exhaust gas recirculation (EGR) device. The exhaust pipe is connected to the exhaust manifold to exhaust the exhaust gas outside the vehicle. The exhaust gas recirculation device is mounted on the exhaust pipe such that the exhaust gas exhausted from the engine passes through the exhaust gas recirculation device. Also, the exhaust gas recirculation device is connected to the intake manifold such that a part of the exhaust gas is mixed with the air to control a combustion temperature.

The combustion temperature may be controlled by ON/OFF-controlling an EGR valve (not shown) provided at the exhaust gas recirculation device. That is, by ON/OFF-controlling the EGR valve, the amount of the exhaust gas supplied to the intake manifold is controlled. In the exhaust device, a particulate filter mounted at the exhaust pipe for collecting the particulate matter included in the exhaust gas may be further included. The particulate filter may be a catalyzed particulate filter according to an exemplary embodiment of the present disclosure to purify various materials as well as the particulate matter included in the exhaust gas. Next, the catalyzed particulate filter according to an exemplary embodiment of the present disclosure will be described in detail with reference to accompanying drawings.

Figure 2:
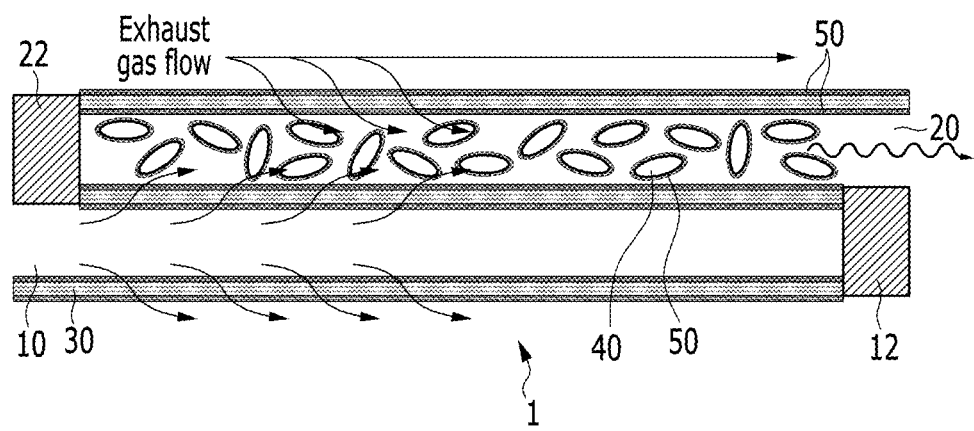
FIG. 2 is a cross-sectional view of the catalyzed particulate filter of FIG. 1.
Figure 3:
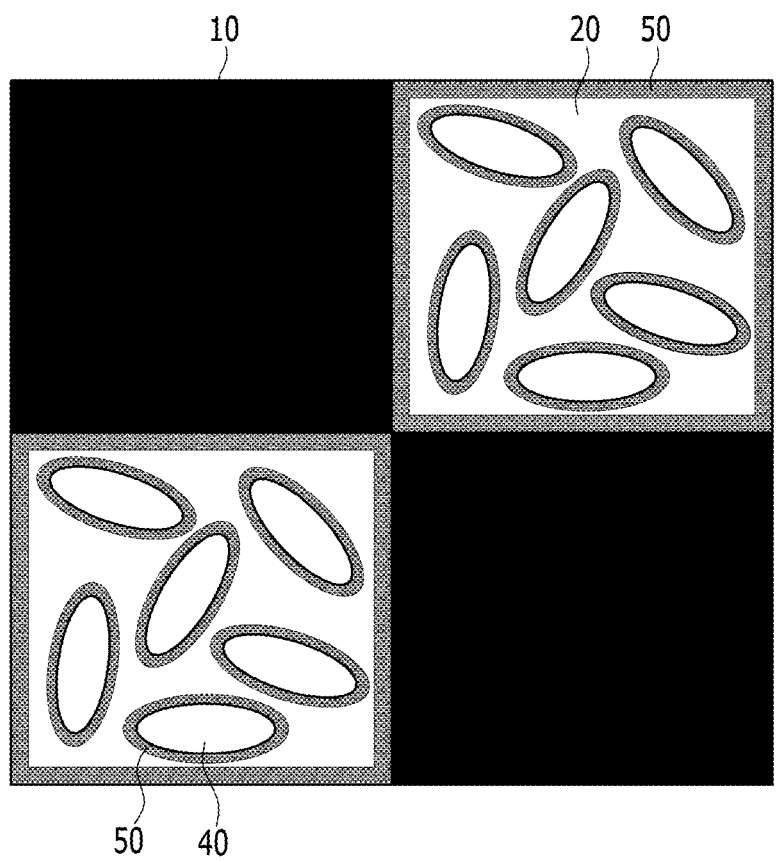
FIG. 3 is a rear view partially showing an inflow channel and an outflow channel of the catalyzed particulate filter of FIG. 1.

First, the catalyzed particulate filter according to the first exemplary embodiment of the present disclosure will be described with reference to FIG. 1 to FIG. 3. FIG. 1 is a perspective view of a catalyzed particulate filter according to a first exemplary embodiment of the present disclosure, FIG. 2 is a cross-sectional view of the catalyzed particulate filter of FIG. 1, and FIG. 3 is a rear view partially showing an inflow channel and an outflow channel of the catalyzed particulate filter of FIG. 1. As shown in FIG. 1 to FIG. 3, the catalyzed particulate filter 1 according to the first exemplary embodiment of the present disclosure may include at least one inflow channel 10 and at least one outflow channel 20 in a housing. A plurality of inflow channels 10 and outflow channels 20 are divided by a wall 30. Also, a supporting member 40 may be disposed inside at least one outflow channel 20.

The inflow channel 10 and the outflow channel 20 may be all collectively referred to as cell. Also, the shape of the housing is a cylinder shape and the shape of the cell may be quadrangle, however the shape of the housing and the shape of the cell are not limited to such a shape and may be formed of various shapes.

Referring to FIG. 2 and FIG. 3, the inflow channel 10 extends along a flow of the exhaust gas. A front of the inflow channel 10 is opened such that the exhaust gas inflows inside the particulate filter 1 through the inflow channel 10. A rear of the inflow channel 10 is blocked by a first plug 12. Accordingly, the exhaust gas inside the particulate filter 1 may be not released outside the particulate filter 1 through the inflow channel 10. The outflow channel 20 may extend along the flow of the exhaust gas and may be disposed to be parallel to the inflow channel 10.

In an embodiment, at least one inflow channel 10 is positioned near the outflow channel 20. For example, if the shape of the cell is quadrangle, the wall 30 enclosing the outflow channel 20 has four surfaces. At least one surface among four surfaces of the wall 30 enclosing the outflow channel 20 may be positioned between the outflow channel 20 and the inflow channel 10 neighboring thereto. If the shape of the cell is quadrangle, the outflow channel 20 is enclosed by four neighboring inflow channels 10, and the inflow channel 10 is enclosed by four neighboring outflow channels 20, however it is not limited thereto.

The front of the outflow channel 20 is blocked by the second plug 22 such that the exhaust gas may not inflow inside the particulate filter 1 through the outflow channel 20. The rear of the outflow channel 20 is opened such that the exhaust gas inside the particulate filter 1 may be outflowed outside the particulate filter 1 through the outflow channel 20.

The wall 30 is disposed between the inflow channel 10 and the outflow channel 20 neighboring to each other, thereby defining a boundary. The wall 30 may be a porous wall 30 in which at least one micropore is formed. The porous wall 30 fluid-communicates the inflow channel 10 and the outflow channel 20 neighboring each other. Accordingly, the exhaust gas inflowing to the inflow channel 10 may be moved to the outflow channel 20 thorough the porous wall 30.

In an embodiment, the porous wall 30 does not pass the particulate matter included in the exhaust gas. When the exhaust gas moves from the inflow channel 10 to the outflow channel 20 through the porous wall 30, the particulate matter included in the exhaust gas is filtered by the porous wall 30. The porous wall 30 may be manufactured from aluminum titanate, codieriteor silicon carbide, etc.

A catalyst 50 may be coated to the porous wall 30. However, such a catalyst 50 coating arrangement is not limited thereto. That is, depending on a design intention, various catalysts 50 such as a three-way catalyst, an oxidation catalytic, a hydrocarbon trap catalyst, a selective catalytic reduction (SCR) catalyst, etc. may be coated to the wall 30. Also, the catalyst 50 of two or more kinds may be coated to the wall 30. For example, the three-way catalyst may be coated on the inner wall of the inflow channel 10, and the selective reduction catalyst may be coated on the inner wall of the outflow channel 20.

The supporting member 40 may be disposed inside the outflow channel 20. The supporting member 40 may be a plurality of structures for absorbing the catalyst as a ball shape, and the structures of the ball shape may fill at least part of an inside of the outflow channel 20. The supporting member 40 according to a present exemplary embodiment is the structure of an oval shape as one example, however various other structure shapes may be provided and/or employed.

The supporting member 40 according to the first exemplary embodiment of the present disclosure may include at least one of the porous ball and the catalyst supporting ball. For example, the supporting member 40 may be the ceramic ball, and further may be an alumina ball including $Al_2O_3$.

The catalyst 50 may be coated to the supporting member 40. That is, depending on a design intention, various catalysts 50 such as a three-way catalyst, an oxidation catalytic, a hydrocarbon trap catalyst, a selective catalytic reduction (SCR) catalyst, etc. may be coated to the supporting member 40. Also, the catalyst 50 of two or more kinds, or constituent materials, may be coated to the supporting member 40. For example, the three-way catalyst and the selective reduction catalyst may be sequentially coated to the supporting member 40. Furthermore, the three-way catalyst may be coated to the part of the supporting member 40 and the selective reduction catalyst may be coated at the remaining part.

The kind of the catalyst 50 coated to the supporting member 40 may be the same as or different from the kind of the catalyst 50 coated to the wall 30. When the supporting member 40 is the porous material, the catalyst 50 is coated to the surface of the supporting member 40 and the inner pore of the supporting member 40. Alternatively, when the supporting member 40 is the non-porous material, the catalyst 50 may be coated to the surface of the supporting member 40. Further, the amount of the catalyst 50 coated to the supporting member 40 may be more than the amount of the catalyst 50 coated to the wall 30.

The wall 30 executes the function of a filter such that the catalyst 50 may be thinly coated to the wall 30, however the supporting member 40 does not execute the function of the filter such that the catalyst 50 may be thickly coated to the supporting member 40.

The supporting member 40 coated with the catalyst 50 may be formed by together coating a catalyst slurry and an junction member to the supporting member 40 including at least one among the porous ball or the catalyst supporting ball. Also, a drying process and a baking process may be sequentially executed to fix the supporting member 40 inside the outflow channel 20 after inserting the supporting member 40 inside the outflow channel 20. In such a case, the drying process may be executed at 100-140° C. for 1-3 hours, and the baking process may be executed at 400-600° C. for 1-3 hours.

As described above, the particulate filter 1 according to the first exemplary embodiment of the present disclosure may include the supporting member 40 filled inside the outflow channel 20 such that the amount of the coated catalyst 50 may increase. Here, the amount of the catalyst 50 means the amount of the catalyst coated per unit length or unit area. Also, the supporting member 40 may only be formed in the outflow channel 20 that is the channel in the outlet direction, but may not be formed in the inflow channel 10 such that an increasing of back pressure may be minimized.

Figure 4:
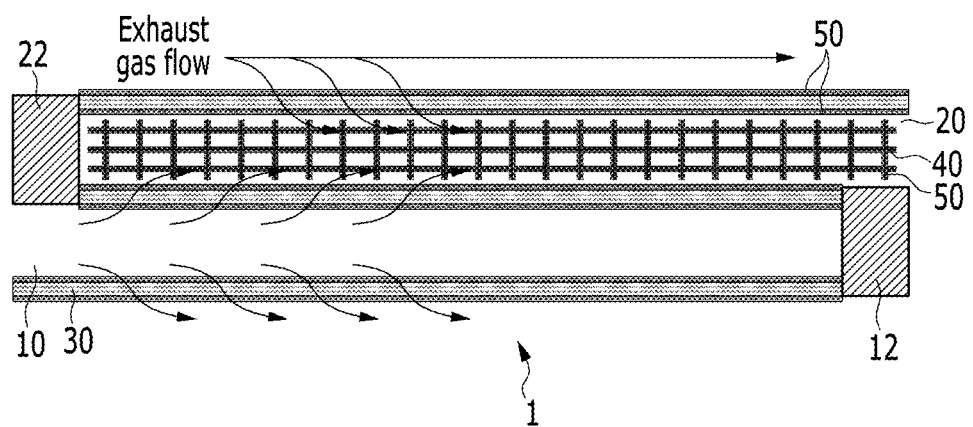
FIG. 4 is a cross-sectional view of a catalyzed particulate filter according to a second exemplary embodiment of the present disclosure.
Figure 5:
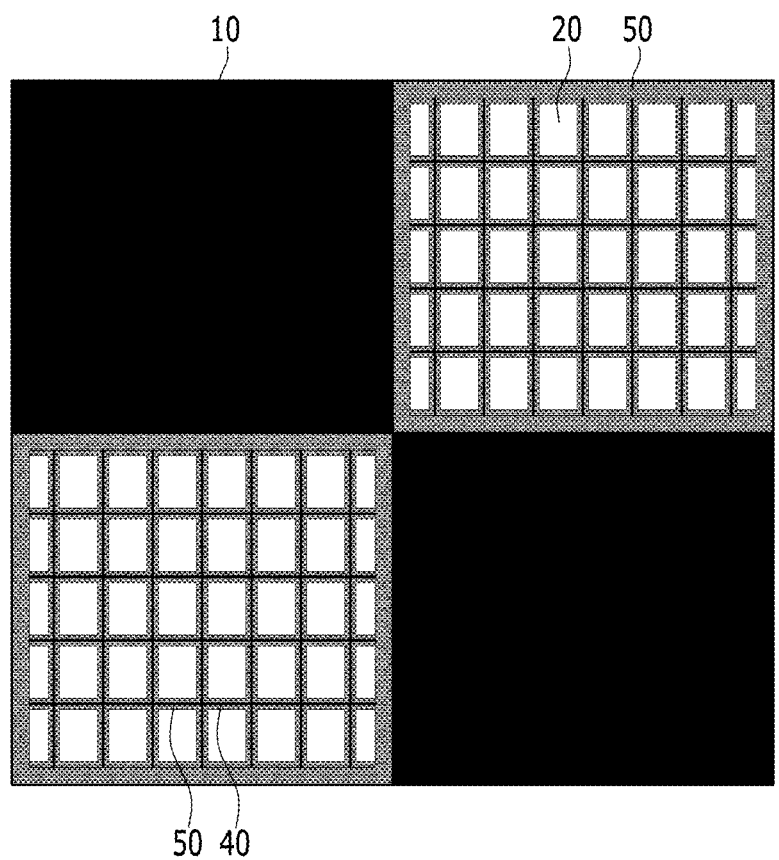
FIG. 5 is a rear view partially showing an inflow channel and an outflow channel of the catalyzed particulate filter of FIG. 4.

Next, the particulate filter according to the second exemplary embodiment of the present disclosure will be described with reference to FIG. 4 and FIG. 5. FIG. 4 is a cross-sectional view of a catalyzed particulate filter according to a second exemplary embodiment of the present disclosure, and FIG. 5 is a rear view partially showing an inflow channel and an outflow channel of the catalyzed particulate filter of FIG. 4.

The catalyzed particulate filter according to the second exemplary embodiment of the present disclosure is the same as the catalyzed particulate filter according to the above-described first exemplary embodiment except for the structure of the supporting member such that an overlapping description is omitted. Referring to FIG. 4 and FIG. 5, the supporting member 40 of the particulate filter 1 according to the second exemplary embodiment of the present disclosure may be at least one of metal foam, metal fiber, wire mesh, ceramic foam, and ceramic fiber as the porous structure. Here, the material of the metal foam, the metal fiber, and the wire mesh may include at least one of aluminum (Al), copper (Cu), nickel (Ni), manganese (Mn), magnesium (Mg), iron (Fe) and titanium (Ti). Also, the material of the ceramic foam and the ceramic fiber may include at least one among silicon (Si), carbon (C) and nitrogen (N). Like the first exemplary embodiment, the catalyst 50 may be coated to the surface of the supporting member 40, and the amount of the coated catalyst 50 may increase through the supporting member 40. Also, the supporting member 40 is formed to the outflow channel 20 that is the channel of the outlet direction, but is not formed in the inflow channel 10 such that an increasing of the back pressure may be minimized.

Figure 6:
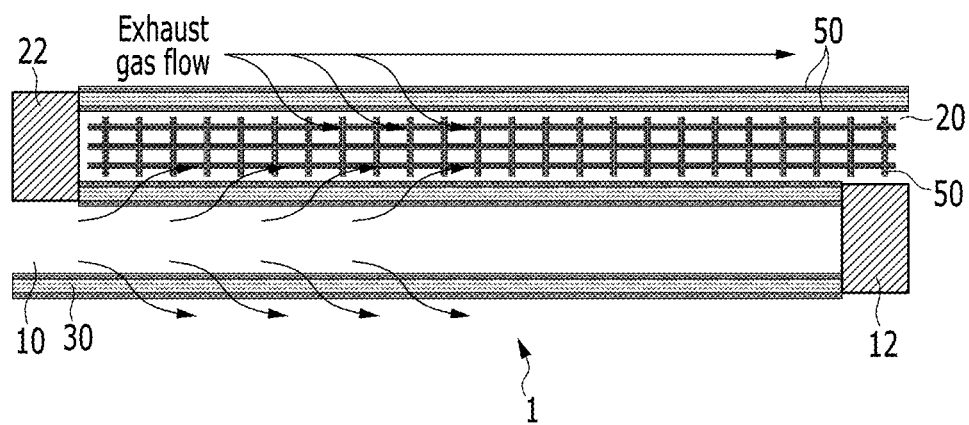
FIG. 6 is a cross-sectional view of a catalyzed particulate filter according to a third exemplary embodiment of the present disclosure.

Next, a particulate filter according a third exemplary embodiment of the present disclosure will be described with reference to FIG. 6. FIG. 6 is a cross-sectional view of a catalyzed particulate filter according to a third exemplary embodiment of the present disclosure. The catalyzed particulate filter according to the third exemplary embodiment of the present disclosure is the same as the catalyzed particulate filter according to the above-described second exemplary embodiment except for the supporting member such that the overlapping description is omitted.

Referring to FIG. 6, the catalyzed particulate filter according to the third exemplary embodiment of the present disclosure may include the catalyst 50 formed while filling at least part of an inside of the outflow channel 20. Here, the catalyst 50 may be formed of at least one of the catalyst foam and the catalyst fiber. That is, without the supporting member 40 of the catalyst 50, the catalyst 50 is itself formed of the foam, the fiber and/or the mesh shape.

Figure 7:
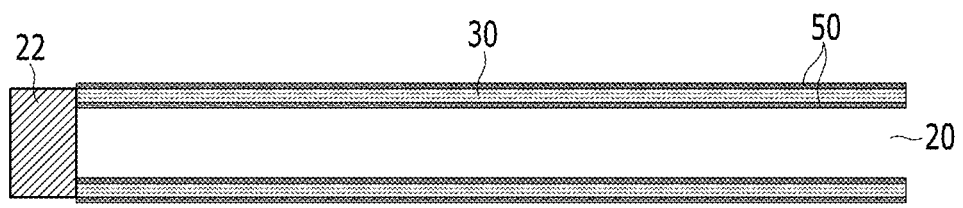
FIG. 7 to FIG. 9 are views sequentially showing a manufacturing process of a catalyzed particulate filter according to a third exemplary embodiment of the present disclosure.
Figure 8:
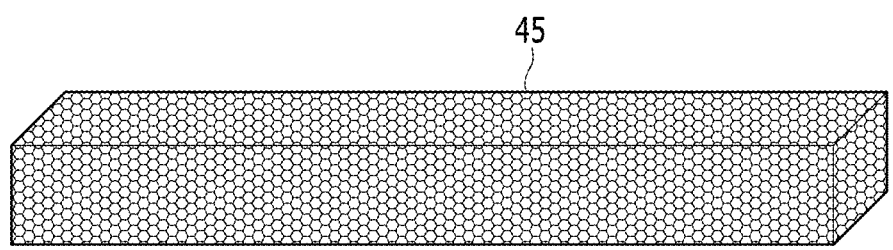
Figure 9:
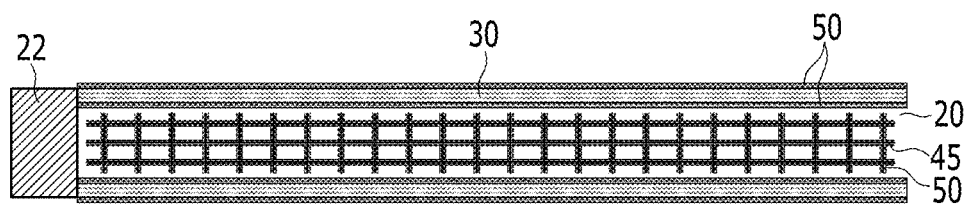

The method forming the catalyst 50 inside the outflow channel 20 of the catalyzed particulate filter according to the third exemplary embodiment will be described with reference to FIG. 7 to FIG. 9. FIG. 7 to FIG. 9 are views sequentially showing a manufacturing process of a catalyzed particulate filter according to a third exemplary embodiment of the present disclosure. FIG. 7 to FIG. 9 only show the outflow channel 20 of the particulate filter 1, for convenience.

First, as shown in FIG. 7, the cell of the particulate filter 1 including the outflow channel 20 formed by being enclosed by the wall 30 coated with the catalyst 50 in four directions is manufactured.

Also, as shown in FIG. 8, a foam template 45 of the size corresponding to the size of the internal space of the outflow channel 20 is manufactured. In this case, because the foam template 45 must be removed through the drying and baking processes after executing the function of fixing the catalyst that will be described later, the foam template 45 may be formed of at least one of carbon, polymer and a Styrofoam.

Next, referring to FIG. 9, after inserting the foam template 45 inside the outflow channel 20 of the particulate filter 1, the catalyst slurry is packed inside the outflow channel 20 to be uniformly coated to the foam template 45. Next, by removing the foam template 45 through the drying and baking processes and hardening the catalyst 50, the catalyst 50 that was coated to the foam template 45 may be formed of a catalyst foam shape that is similar to the original shape of the foam template 45, thereby completing the particulate filter according to the third exemplary embodiment shown in FIG. 6.

As described above, in the catalyzed particulate filter according to an exemplary embodiment of the present disclosure, as the supporting member is formed inside at least one outflow channel and the catalyst is coated to the supporting member, the catalyst loading amount may increase while minimizing the increasing of back pressure. Also, since the catalyst loading amount and the contact area (time) of the fluid and the catalyst may increase while maintaining the thickness of the wall, filter performance and catalyst performance may be sufficiently obtained.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:
1. A catalyzed particulate filter comprising:
at least one inflow channel including one end where a fluid inflows and another end that is blocked and extends in a length direction;
at least one outflow channel including one end that is blocked and another end where the fluid outflows, and the other end extends in the length direction;
at least one porous wall defining a boundary between the inflow channel and the outflow channel neighboring each other and extending in the length direction; and
a catalyzed supporting member disposed on an inside of the outflow channel,
wherein the supporting member includes a plurality of balls,
wherein the porous wall and the supporting member are coated with catalyst, and
wherein an amount of catalyst coated to the supporting member is more than an amount of catalyst coated to the porous wall.
2. The catalyzed particulate filter of claim 1, wherein the supporting member includes any one of a porous ball and a catalyst supporting ball.
3. The catalyzed particulate filter of claim 2, wherein the supporting member includes a ceramic ball.
4. The catalyzed particulate filter of claim 3, wherein the supporting member includes a alumina ball.
5. A catalyzed particulate filter comprising:
at least one inflow channel including one end where a fluid inflows and another end that is blocked and extends in a length direction;
at least one outflow channel including one end that is blocked and another end where the fluid outflows, and the other end extends in the length direction;
at least one porous wall defining a boundary between the inflow channel and the outflow channel neighboring to each other and extending in the length direction; and
a catalyzed supporting member disposed on an inside of the outflow channel,
wherein the catalyzed supporting member includes a structure having a porous structure,
wherein the porous wall and the supporting member are coated with catalyst, and
wherein an amount of catalyst coated to the supporting member is more than an amount of catalyst coated to the porous wall.

6. The catalyzed particulate filter of claim 5, wherein the supporting member includes at least one selected from the group consisting of a metal foam, a metal fiber, a wire mesh, a ceramic foam and a ceramic fiber.

7. The catalyzed particulate filter of claim 6, wherein the metal foam, the metal fiber, and the wire mesh include at least one selected from the group consisting of aluminum, copper, nickel, manganese, magnesium, iron and titanium.

8. The catalyzed particulate filter of claim 6, wherein the ceramic foam and the ceramic fiber include at least selected from the group consisting of silicon, carbon and nitrogen.

9. The catalyzed particulate filter of claim 5, wherein the supporting member includes at least one of a catalyst foam and a catalyst fiber.

* * * * *